United States Patent [19]

Force, Jr. et al.

[11] 4,372,355
[45] Feb. 8, 1983

[54] WOOD TURNING LATHE APPARATUS

[75] Inventors: Wallace B. Force, Jr.; Francis D. Jefferson, both of Wabash, Ind.

[73] Assignee: Diehl Machines, Div. of Waltham Watch Company, Wabash, Ind.

[21] Appl. No.: 207,138

[22] Filed: Nov. 17, 1980

[51] Int. Cl.³ .......................... B27C 7/00; B23B 23/00
[52] U.S. Cl. .......................... 142/55; 142/3; 142/4; 82/31
[58] Field of Search ............... 142/1, 3, 4, 5, 7, 55; 82/3, 28 R, 31

[56] References Cited

U.S. PATENT DOCUMENTS

| | | | |
|---|---|---|---|
| 1,168,162 | 1/1916 | Chernack | 82/3 |
| 1,544,875 | 7/1925 | Amann | 142/7 |
| 1,914,984 | 6/1933 | Smith et al. | 82/31 |
| 3,796,116 | 3/1974 | Spreitzer | 82/31 |

FOREIGN PATENT DOCUMENTS 482079  2/1917  France ........................ 82/3

OTHER PUBLICATIONS

Diehl, "Automatic Hydraulic Wood Turning Lathes", Models TL41 & TL 42, Bulletin TL42-2.5M-6-76.

*Primary Examiner*—Leonidas Vlachos

[57] ABSTRACT

A wood turning lathe is provided with a centrally located head and tail stock mounting apparatus which in combination with head and tail stocks on the opposite ends of the lathe define two turning stations. The mounting apparatus includes a supporting block unit having head and tail stock work centers rotatable about a common axis with the head stock center being held against axial movement. The tail stock center is hydraulically operated to be selectively reciprocable. This reciprocable movement is provided by means of a hydraulic power cylinder in the supporting block unit having a sealed chamber which receives a piston mounted on a rotatable shaft which carries the tail stock center. The piston divides the chamber into two variable volume compartments, two ports in the block unit being provided for admitting an exhausting pressure fluid to and from such compartments, respectively.

7 Claims, 6 Drawing Figures

WOOD TURNING LATHE APPARATUS

BACKGROUND OF THE INVENTION

1. Field of the Invention

The present invention relates to wood turning lathes and more particularly to a lathe having two independent stations at which different shapes may be turned simultaneously.

2. Description of the Prior Art

Wood turning lathes for industrial use are well known, typical of such lathes being the Diehl TL41 and TL42 automatic hydraulic turning lathes. Such lathes conventionally provide a single station for turning shapes, and it is with respect to these particular lathes that the present invention constitutes an addition. Other lathe apparatuses are disclosed in U.S. Pat. Nos. 444,799; 1,252,271; 1,168,162; 1,188,850; 2,188,832; 2,828,783 and 3,830,268.

SUMMARY OF THE INVENTION

The present invention relates to a head and tail stock mounting apparatus for use in a lathe mechanism, this apparatus including a supporting block unit having a head stock work center carried for rotation about a given axis but held against axial movement. A tail stock work center is rotatable about the same axis but is movable axially by means of a hydraulic power cylinder also carried by the supporting block unit. This power cylinder includes a piston and shaft reciprocably received by a chamber, which define two variable volume compartments within the chamber. The tail stock work center is secured to the shaft reciprocably received by a chamber, which define two variable volume compartments within the chamber. Two ports are provided in the block unit, one for each of the compartments. Pressure fluid may be introduced into and exhausted from said compartments, respectively, for reciprocating the piston and shaft.

A two station lathe mechanism has the stock mounting apparatus just described mounted on the frame thereof. A second tail stock work center is mounted on one end of this frame for rotational and axial movement on the same axis and is juxtaposed in spaced relation with respect to the first-mentioned head stock center. A second head stock work center is mounted on the opposite end of the frame in juxtaposition with respect to the first-mentioned tail stock center. A pressure fluid operated power cylinder is provided for reciprocating the second tail stock center. A common shaft is used for rotating the second head and tail stock centers in unison. In combination with the two turning stations thus defined by the work centers are two feed hoppers by means of which blanks may be delivered thereto and turned simultaneously to the same or different shapes as desired.

It is an object of this invention to provide an accessory work center apparatus for converting a single station lathe into a lathe having two stations.

It is a further object to provide for improvements in wood turning lathes having two stations.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 1:
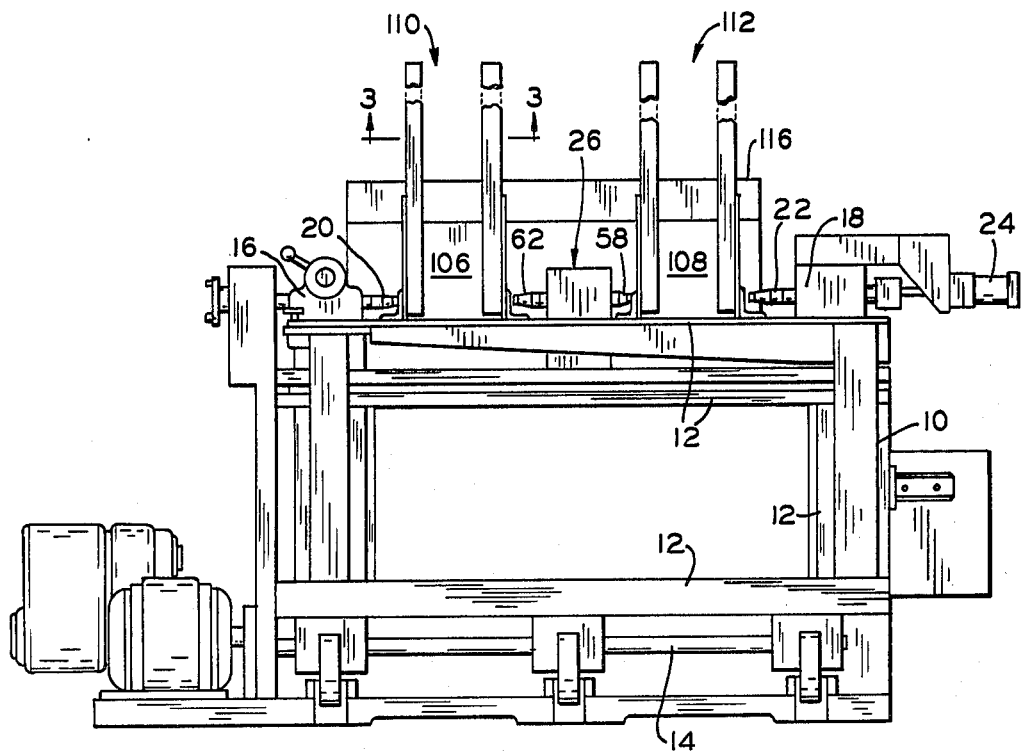
FIG. 1 is a view in outline form of a lathe embodying the apparatus of this invention.

Referring to the drawings, the lathe generally includes a stationary frame 10 having a movable frame 12 which is pivotable about a horizontal shaft 14. Mounted on a horizontal table portion of the movable frame 12 are head and tail stocks 16 and 18 which are driven by a common shaft (not shown) for rotating the head and tail centers 20 and 22 in unison about a common axis. A double acting hydraulic power cylinder 24 on the frame 12 is operatively connected to the tail work center 22 for imparting reciprocable movement thereto. The lathe thus far described is conventional, being identified in the trade by the trademarks DIEHL TL41 and TL42 and manufactured by Diehl Machines of Wabash, Indiana.

Also mounted on the frame 12 intermediate the two work centers 20 and 22 is an auxiliary head and tail stock apparatus generally indicated by the numeral 26. This apparatus 26 includes a block unit 28 composed of three parts rigidly secured together by means of threaded fasteners 30, these parts being a housing element 32, a cylinder body 34 and a cylinder head 36. The housing element 32 has an enlarged foot portion 38 which is adapted to be rigidly secured to the table portion of the lathe frame 12.

The housing element 32 is provided with a bore having three stepped diameter portions 40, 42 and 44, the portion 40 having a sleeve bearing which receives for rotation an elongated spindle 46. The spindle 46 is provided with an annular flange 48 operatively engageable on one side with a radial shoulder 50 separating the bore portions 40 and 42 and on the other side with a thrust bearing 52 engageable with an abutment gland 54 fitted into the larger diameter portion 44. A washer 56 is interposed between the thrust bearing 52 and the gland 54.

A head stock work center 58 is received within the end portion of the spindle 46 and is secured for rotation therewith by means of a set screw 60.

On the opposite side of the block unit 28 is a tail stock work center 62 which is secured within the end of a shaft 64 by means of a set screw 66. The shaft 64 is rotatably received within a bearing opening 68 in the cylinder head 36, a sleeve bearing 70 being interposed between the shaft 64 and bearing opening 68.

The cylinder body 34 has an enlarged cylindrical chamber 72 which coaxially surrounds the shaft 64. The ends of the chamber 72 are closed by means of the cylinder head 36, the gland 54 and the housing element 32.

The shaft 64 has a cylindrical socket 74 in the right-hand end which rotatably receives the end portion 76 of the spindle 46. This end portion 76 has a flat 78 on one side which serves as a flow passage between the righthand end of the chamber 72 and the socket 74 for a purpose which will be explained later.

A piston 80 is reciprocably received by the chamber 72, dividing it into two variable volume compartments 82 and 84. The piston 80 is secured to the shaft 64 by means of a nut element 86 threaded over the righthand end of the shaft 64. Two disc-like retainers 88 on opposite sides of piston 80 hold two ring-shaped seals 90 in place. A similar ring-shaped seal 92 encircles the shaft 64 and is held in position against the righthand end of the bushing 70 by means of a retaining washer 94 secured to the cylinder head 36. Another ring seal 94 surrounds the spindle portion 76 and is disposed between the retaining washer 56 and the abutment gland 54 as shown. These seals and the others denoted by reference numerals prevent leakage of hydraulic fluid.

Two ports 96 and 98 are provided in the cylinder head 36 and body 34, a passage 100 connecting port 96 to compartment 82 and another passage 102 connecting port 98 to compartment 84.

Both the spindle 46 and shaft 64 are rotatable about a common axis 104, the socket 74 having a bearing fit with the spindle portion 76 such that the mating ends of the shaft 74 and spindle portion 76 provide bearing support for each other. The remaining bearing supports for the shaft and spindle are provided by the block unit 28.

By connecting pressure fluid to the port 98 and the port 96 to an exhaust sump, the differential pressure over the piston 80 will cause it to move toward the left in the chamber 72. This same pressure fluid in the compartment 84 will also flow through the flow passage 78 and into the socket 74 enhancing the leftward force imparted to the shaft 64. Reversing the application of pressure and exhaust connections to the ports 96 and 98, of course, forces the piston 80 and the shaft 64 toward the right.

Figure 2:
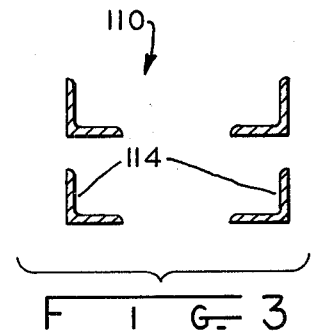
FIG. 2 is an end view thereof.
Figure 3:
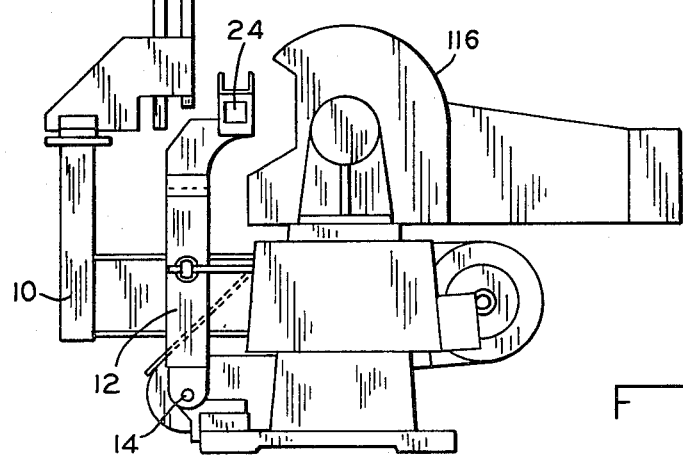
FIG. 3 is a cross section taken substantially along section line 3—3 of FIG. 1.
Figure 4:
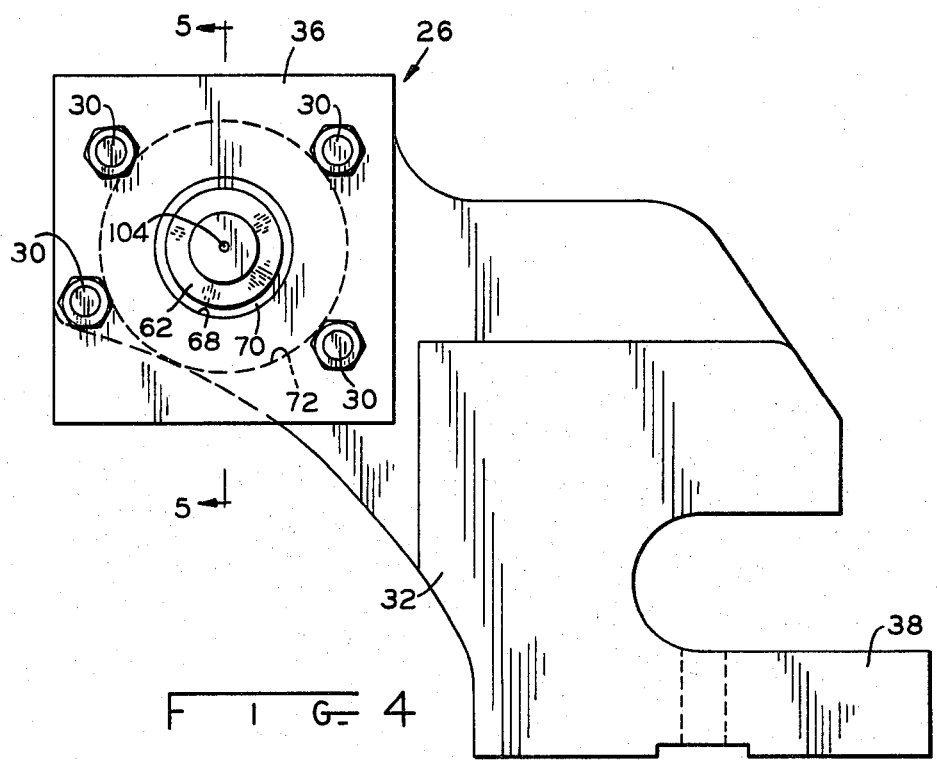
FIG. 4 is an end view of the head and tail stock mounting apparatus of this invention.
Figure 6:
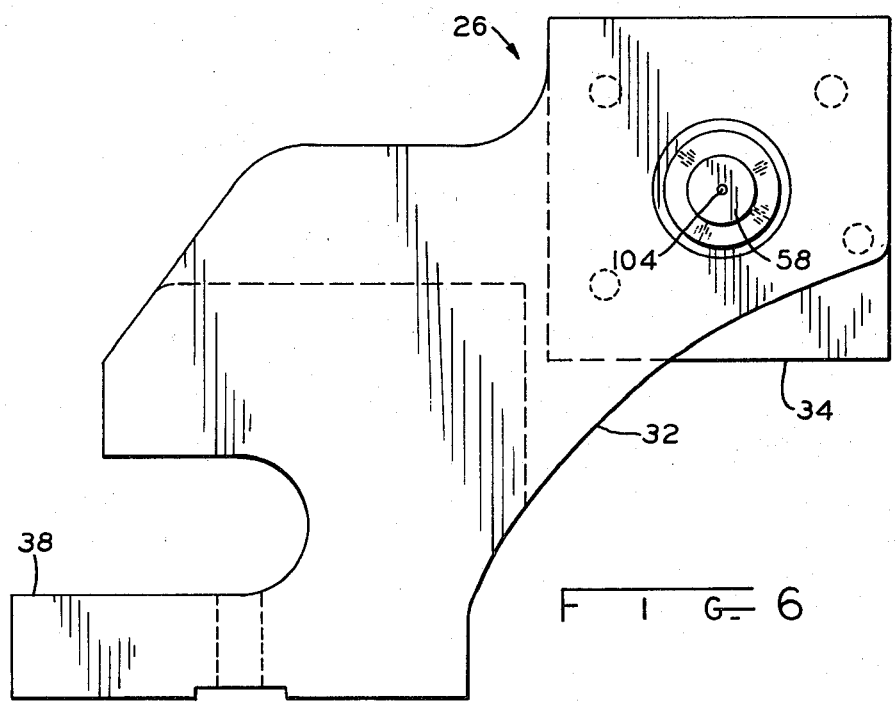
FIG. 6 is an opposite end view of this apparatus.
Figure 5:
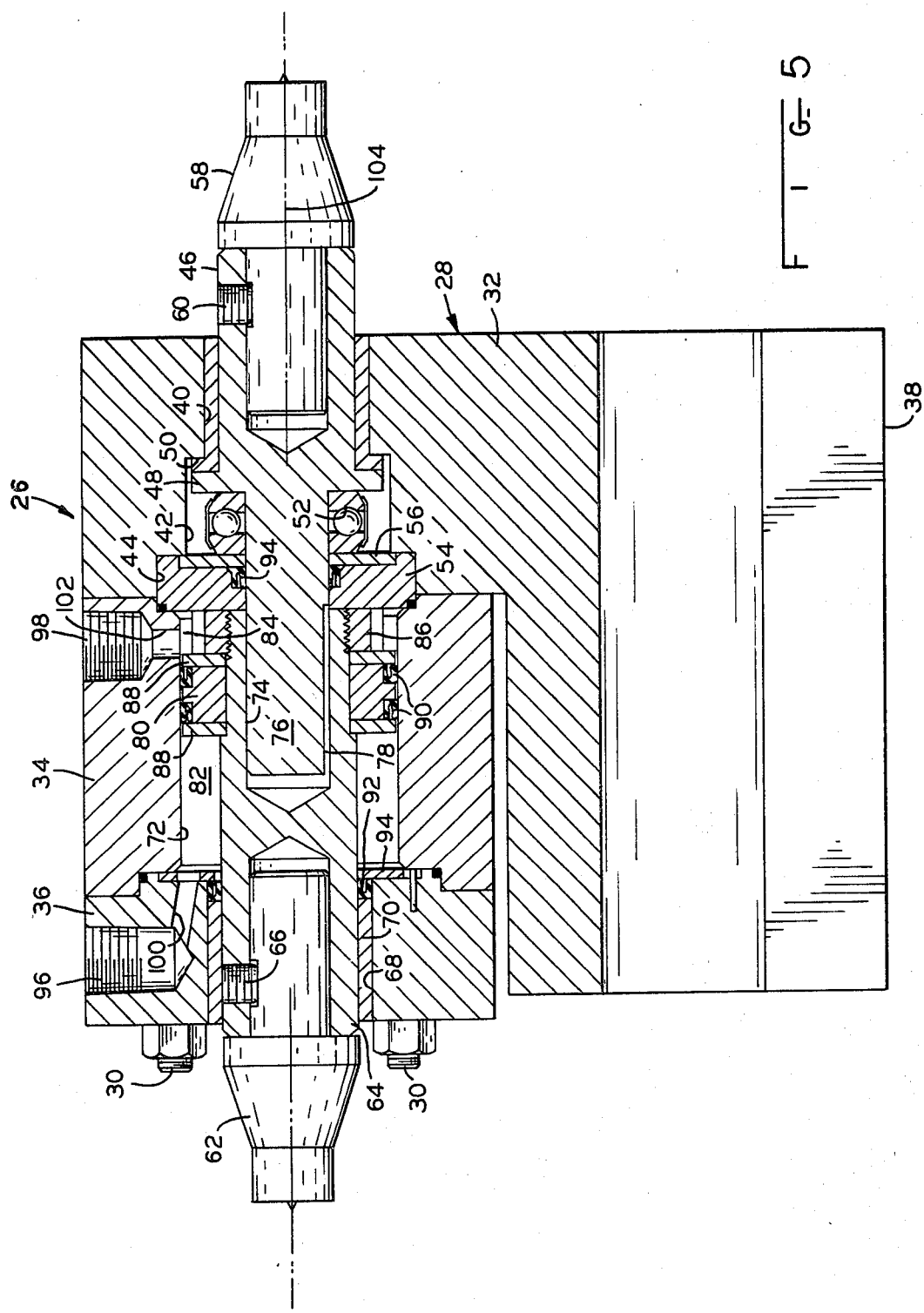
FIG. 5 is a longitudinal section taken substantially along section line 5—5 of FIG. 4.

It may now be observed that the head stock work center 58 is held against axial movement but is freely rotatable about the axis 104. On the other hand, the tail stock work center 62 while also being freely rotatable about the axis 104 is also movable axially under the control of the power cylinder 64, 72, 80. In the lathe as shown in FIGS. 1 and 2, this head and tail stock apparatus 26 is disposed intermediate the two work centers 20 and 22 which are both driven in unison at the same rotational speed by means of a common shaft (not shown). Turning stations 106 and 108 are thereby defined between the two work centers 20 and 22 and the head and tail stock apparatus 26 as shown.

In registry with these two stations 106 and 108 are two hoppers indicated generally by the numerals 110 and 112, these hoppers being identically constructed and consisting primarily of two upright, spaced and parallel channels 114 formed of angle irons, adapted to receive elongated blanks to be turned in the lathe. The cutters for the lathe are contained within the housing 116 and are conventional.

In operation of the lathe, the power cylinder 24 on the one hand and the power cylinder within the auxiliary apparatus 26 are actuated in directions to retract the respective tail centers. Upon such retraction, pieces that have just been turned within the stations 106 and 108 are dropped from the work centers permitting blanks within the two hoppers 110 and 112 to drop into position between the respective head and tail stocks. The power cylinders 24 and 72, 80 are now actuated thereby to protract the respective tail centers 22 and 62 thereby picking up the two blanks between the centers 20 and 62 on the one hand and 22 and 58 on the other. The machine is then operated conventionally to turn the pieces following which the cycle just described is repeated.

By means of the auxiliary stock apparatus 26, a lathe normally set up with only two stocks 16 and 18 to handle only a single piece can be converted easily into one for turning two pieces simultaneously to either the same or different shapes.

While there have been described above the principles of this invention in connection with specific apparatus, it is to be clearly understood that this description is made only by way of example and not as a limitation to the scope of the invention.

What is claimed is:

1. For use in a plural station wood turning lathe, a head and tail stock mounting apparatus comprising a supporting block unit, a head stock work center carried by said supporting block unit for rotation about a given axis but held against axial movement, a tail stock work center carried by said supporting block unit for rotation about either the same axis or one parallel thereto and also for limited reciprocable axial movement, and means for selectively reciprocating said tail stock work center, said means including a hydraulic power cylinder carried by said supporting block unit having a piston operatively connected to said tail stock work center, said power cylinder and piston including a shaft journalled for rotation within said block unit, said block unit having a sealed stationary cylindrical chamber coaxially surrounding at least a portion of said shaft, a piston element reciprocably and rotatably received within said chamber and dividing said chamber into two variable volume compartments, said piston element being connected to said shaft for imparting reciprocable movement thereto and for being rotated thereby, and two ports in said block unit, one for each compartment, whereby pressure fluid may be introduced into and exhausted from said compartments, respectively, for reciprocating said piston element.

2. For use in a plural station wood turning lathe, a head and tail stock mounting apparatus comprising a supporting block unit, a head stock work center carried by said supporting block unit for rotation about a given axis but held against axial movement, a tail stock work center carried by said supporting block unit for rotation about either the same axis or one parallel thereto and also for limited reciprocable axial movement, and means for selectively reciprocating said tail stock work center, said means including a hydraulic power cylinder carried by said supporting block unit having a piston operatively connected to said tail stock work center, said power cylinder and piston including a shaft journalled for rotation within said block unit, said block unit having a sealed stationary cylindrical chamber coaxially surrounding at least a portion of said shaft, a piston element reciprocably and rotatably received within said chamber and dividing said chamber into two variable volume compartments, said piston element being connected to said shaft for imparting reciprocable movement thereto and for being rotated thereby, and two ports in said block unit, one for each compartment, whereby pressure fluid may be introduced into and exhausted from said compartments, respectively, for reciprocating said piston element, said head and tail stock centers being coaxial, a spindle connected to said head stock work center and journalled in said supporting block unit; the inner end portion of one of said shaft and spindle having a coaxial socket which rotatably supportably receives the end portion of the other of said shaft and spindle, an elongated clearance between the wall of said socket and the end portion of the other end portion, the inner end of said shaft being disposed within said chamber and in communication with one of said compartments, said clearance providing for flow of fluid between said socket and said one compartment.

3. The apparatus of claim 2 wherein said spindle has a radial shoulder intermediate the ends thereof, a thrust bearing on said spindle between said shoulder and an abutment carried by said block unit thereby to limit movement of said head stock toward said tail stock work center.

4. The apparatus of claim 3 wherein said supporting block unit includes a housing element, a cylinder body and a cylinder head rigidly secured together, said housing element having a journal opening which receives said spindle, said cylinder body having a bore which provides said chamber and which is coaxial with said journal opening, said cylinder head having a bearing opening which receives said shaft and which is coaxial with respect to said chamber bore, said chamber bore being of larger diameter than said bearing opening, said cylinder head closing one end of said chamber and said other compartment, one of said ports being in said cylinder head, a passage extending from said one port to said other compartment and the other port being in said cylinder body and communicating with said one compartment.

5. The apparatus of claim 4 wherein the journal opening in said housing element is of stepped diameter forming two adjoining cavities with the larger of said cavities being adjacent to said cylinder body, an annular sealing gland received by said larger cavity and closing the opposite end of said chamber, said gland surrounding said spindle and serving as the abutment for said thrust bearing, said thrust bearing fitting within the smaller cavity.

6. A lathe mechanism including the apparatus of claim 1 and having a frame which carries said stock mounting apparatus, a second tail stock work center mounted on said frame for rotational and axial movement on said given axis and juxtaposed in spaced relation with respect to said the first-mentioned head stock work center, a second head stock work center mounted on said frame for rotational movement on said given axis and juxtaposed in spaced relation with respect to said first-mentioned tail stock work center, and means for selectively reciprocating said second tail stock center, said second tail and head stock centers being rotatable in unison.

7. The lathe mechanism of claim 6 wherein each first-mentioned head stock center in combination with said second tail stock center and each first-mentioned tail stock center in combination with said second head stock center constitute first and second turning stations, first and second hoppers on said frame for delivering blanks to be turned to said first and second stations, respectively, said apparatus being interposed between said hoppers.

* * * * *